PULSE SYNCHRONIZING CIRCUITS

Filed Feb. 19, 1951 3 Sheets-Sheet 1

Inventor
MATTHEW WILLIAM BAKER &
DEREK ANTHONY UNDERWOOD RUSH
By Herbert H. Thompson
His Attorney.

Inventor
MATTHEW WILLIAM BAKER, &
DEREK ANTHONY UNDERWOOD RUSH
By Herbert H. Thompson
his Attorney.

PULSE SYNCHRONIZING CIRCUITS

*Inventor*
MATTHEW WILLIAM BAKER &
DEREK ANTHONY UNDERWOOD RUSH
By Herbert H. Thompson
*his Attorney.*

Patented Dec. 15, 1953 2,662,982

UNITED STATES PATENT OFFICE 2,662,982

PULSE SYNCHRONIZING CIRCUITS

Matthew William Baker, Blackheath, London, and Derek Anthony Underwood Rush, Ealing, London, England, assignors to The Sperry Gyroscope Company Limited, Brentford, England, a British company Application February 19, 1951, Serial No. 211,606

14 Claims. (Cl. 250—27)

This invention relates to apparatus for producing accurately timed high-power electrical pulses, e. g., for energising a magnetron, and particularly to circuits employing amplifier or relay devices in order to provide high-power pulses in response to accurately timed input pulses.

In such systems there is usually a delay in the operation of the amplifier or relay device, and, if the delay can vary owing to changes of temperature or pressure, or due to ageing of the amplifying device, the changes in the delay will cause errors in the timing of the pulses. Variable delays of this kind are particularly liable to occur where the amplifier or relay device employs a spark gap or gas-discharge tube, such as a thyratron. The delays so introduced are liable to remain substantially constant for a series of consecutive pulses, but to change slowly, so as to have different values for series of such pulses at different times.

The object of the present invention is to provide means whereby the slowly changing systematic delays of the amplifier or relay device used in such apparatus are automatically compensated for, thus reducing the error in the timing of the output pulses to negligible proportions.

The invention consists in apparatus for producing a series of recurrent high-power electrical pulses in a predetermined time relationship with recurrent low-power primary signals of the kind in which a relay device, such as a spark or gas discharge tube, is employed for providing high-power pulses in response to triggering pulses wherein, in order to compensate for variable systematic delays in the operation of the relay device, the primary signals are applied to a controllable delaying device arranged to derive the triggering pulses from the primary signals after a time delay that may be varied by means of a control quantity; wherein means are provided for producing reference signals delayed with respect to the primary signals by a fixed accurately-determined interval; wherein the reference signals and monitoring signals derived from the high-power pulses are together passed to a timing comparator which derives from them an error signal indicative of the time interval between the reference signals and the monitoring signals; and wherein the controllable delaying device is actuated in accordance with said error signal to bring the high-power pulses substantially into synchronism with the reference signals.

The invention will now be described with reference to a particular embodiment in which high-power pulses for energising a magnetron are provided by a thyratron relay device receiving controlling impulses from a crystal-controlled oscillator unit.

In the accompanying drawings Fig. 1 is a block schematic diagram showing the embodiment of the invention described.

Figure 1:
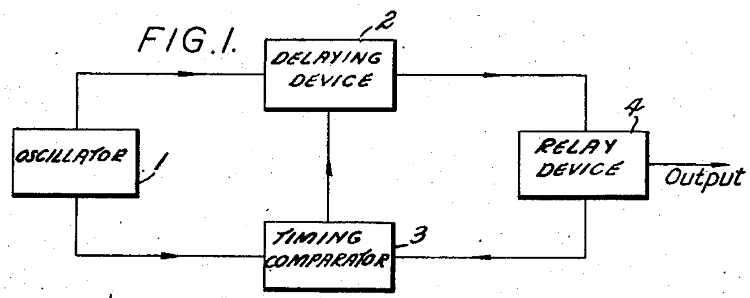
Figure 2:
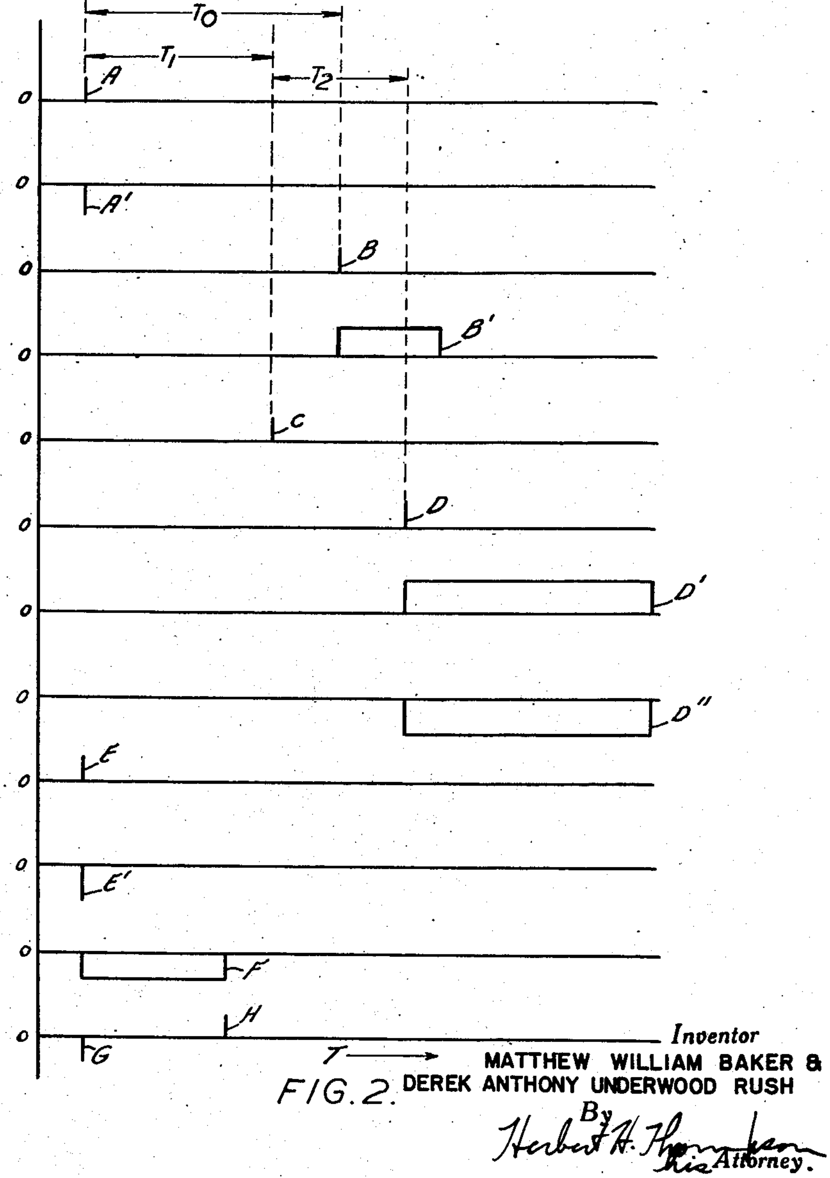
Fig. 2 shows diagrammatically some of the wave forms that occur in the apparatus described.

Referring to Figs. 1 and 2 a crystal controlled oscillator unit 1 provides two output signals namely, an advanced or primary signal A, which is eventually used to provide triggering pulses C for a thyratron 4, and a timing or reference signal B which defines the instants of time at which the high-power output pulses provided by thyratron 4 are required. The total time interval, herein referred to as $T_0$, between the primary signal A and the reference signal B must be accurately constant. Means for producing two accurately spaced outputs from a crystal-controlled oscillator are well known and such means form no part of the present invention. The primary signal A is passed through a controllable delaying device 2 which derives from it triggering pulses C each delayed behind the corresponding primary signal A by a time interval $T_1$. The delaying device 2 is such that this delay time $T_1$ is controllable in dependence on a control voltage applied to it. The triggering pulses C are applied to the control grid of the thyratron, which provides the high-power output pulses after a further time delay, referred to hereinafter as $T_2$, which represents the slowly changing systematic delay for which compensation is required. Monitoring pulses D are derived as a fraction of the thyratron output pulses, and these are passed to the timing comparator 3, which also receives a timing or reference signal B from the crystal-controlled oscillator 1. The timing comparator 3 develops an error signal proportional to the time difference between the monitoring pulses D and the reference signal B. This error signal is applied as the control voltage to vary the time delay $T_1$, introduced by the controllable delaying device 2, by which the triggering pulses C are delayed behind the primary signal A. The device is so arranged that $T_1$ is either increased or decreased under the continued application of the control voltage until $T_1+T_2$ becomes substantially equal to $T_0$, i. e. until the thyratron output pulses become substantially synchronised with the reference signal B.

Figure 3:
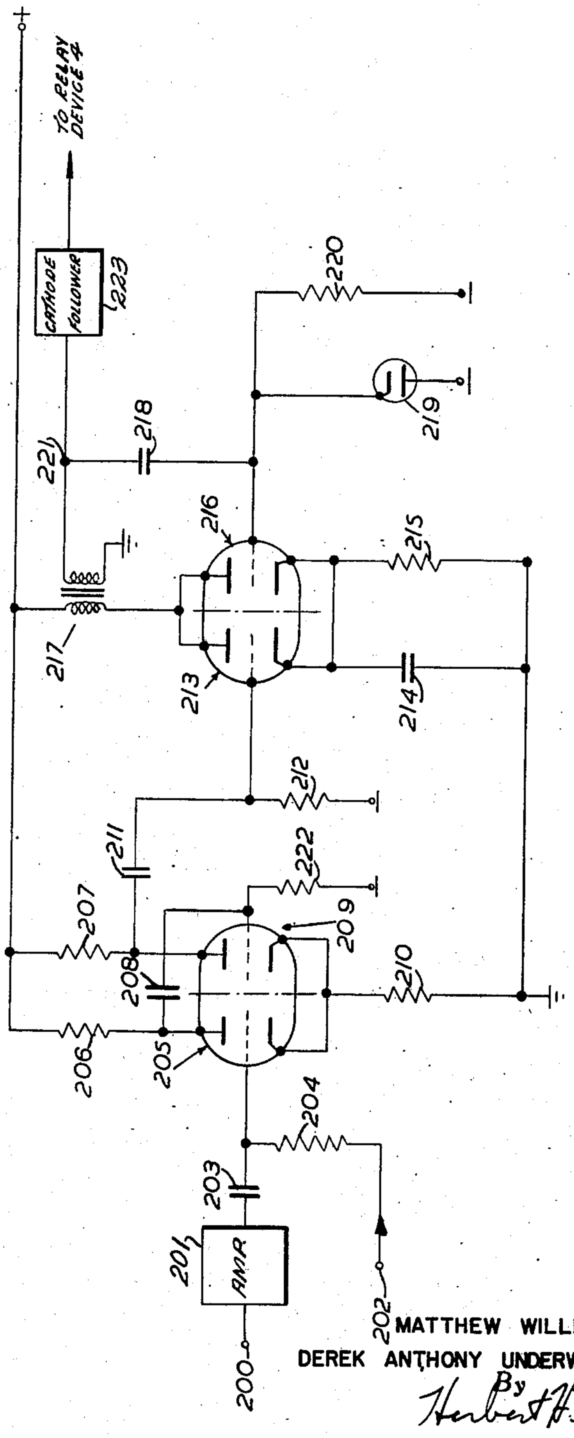
Figs. 3 and 4 are simplified circuit diagrams of portions of the apparatus.

The circuit of a preferred form of the controllable delaying device 2 is shown in Fig. 3. The primary signal A which consists of a train of positive pulses from the oscillator 1, and which may, for example, have a repetition frequency of 3,000 pulses per second is applied to terminal 200 and is inverted by an amplifier 201 which is of conventional design. The resulting negative pulses A' are applied over capacitor 203 to the grid of valve 205. The two valves 205 and 209 (which may be the two portions of a double-triode valve) are connected as a so-called cathode-coupled flip-flop circuit with valve 205 normally conducting. Such a circuit has one stable and one unstable condition of operation. It is normally in the stable condition but the arrival of the negative pulse A' causes it to change to the unstable condition in which it remains for a period of time determined by the characteristics of the valves and the values of the associated components and also by the potential of terminal 202. The error signal produced by the timing comparator 3 is applied to this terminal and thus controls the length of time the circuit remains in the unstable condition. The action of the circuit on receipt of a negative pulse A' is as follows:

The negative pulse A' applied to the grid of valve 205 causes it to cease to conduct and thus produces positive pulse E at its anode and a negative pulse E' at its cathode. Positive pulse E is applied to the grid of valve 209 over capacitor 208. Until the arrival of positive pulse E, valve 209 was prevented from conducting by the negative bias applied to its grid over resistor 222 and also by the positive voltage on its cathode produced by the current flowing through valve 205. The combined effect of the positive pulse E applied to its grid and the negative pulse E' applied to its cathode cause valve 209 to conduct. Current through valve 209 then makes the cathodes of both valves become positive again. After a period of time determined by the characteristics of the valves, the values of capacitor 208 and resistors 206 and 207 and the positive potential on terminal 202, the potential difference between the grid and cathode of valve 205 will reach a value at which the valve will again commence to conduct. A negative pulse will then appear at the anode which is fed over capacitor 208 to the grid of valve 209. The combined effect of this negative pulse, the increasing positive potential on the cathode and the negative bias applied over resistor 222 will cause the valve to cease to conduct. Thus the circuit is restored to the state it was in before the arrival of A'.

When valve 209 commences to conduct, its anode potential drops, and when it ceases to conduct, the anode potential rises. Thus, a negative square wave F is effectively produced at the anode of valve 209. This square wave is differentiated by the resistance-capacity combination 211 and 212, and the resulting positive and negative pulses G and H are applied to the grid of valve 213. The negative pulse G occurs at substantially the same time as the trigger pulse A, while the positive pulse H occurs at an interval after this determined by the voltage on terminal 202. It is this variable interval which is used to vary the time $T_1$.

Valves 213 and 216 (which again may be two portions of a double triode of the same type as valves 205 and 209) are connected in a form of blocking oscillator circuit. Both valves are normally non-conducting as a result of the negative potentials applied to their grids over resistors 212 and 220 respectively. The negative pulse G has no effect on the state of the two valves, but when the positive pulse H arrives, valve 213 commences to conduct. The resulting pulse of current through the primary winding of transformer 217 induces a large voltage in the secondary winding which is applied through capacitor 218 to the grid of valve 216 in such a sense as to make it positive with respect to the cathode. Thus valve 216 is caused to conduct and maintains the current flowing through the primary winding of transformer 217. The positive voltage on the grid of valve 216 is high enough to cause grid current to flow so that capacitor 218 charges through the grid-cathode path of the valve and also through the higher impedance parallel path through resistor 220 and the negative bias supply. Thus the grid of valve 216 becomes less positive, and eventually becomes sufficiently negative with respect to the cathode to cause the valve to cease to conduct. The resulting decay of current through the primary winding of transformer 217 induces a voltage in the secondary winding in such sense that the ungrounded end of the winding becomes negative. This negative potential is added to the voltage across the capacitor 218, due to the charge accumulated therein, and is applied to the grid of the valve 216 to drive it still more negative, thus accelerating the decay of current through the valve. A diode valve 219 is connected between this grid and a point that is at a moderately large negative potential with reference to ground. This prevents the grid of valve 216 reaching an excessive negative potential, since the diode will conduct as soon as its anode becomes positive with respect to its cathode. Thus, after the occurrence of the positive pulse H, the potential of terminal 221 rises sharply to a high positive value, followed by a negative swing, both being of quasi-sinusoidal form. Terminal 221 is connected to the input of a conventional cathode follower 223 the output of which provides the firing pulse C for the thyratron 4 (Fig. 1). It can be seen that this firing pulse C occurs at a time after the occurrence of the primary signal A which is controlled by the potential of terminal 202.

Figure 4:
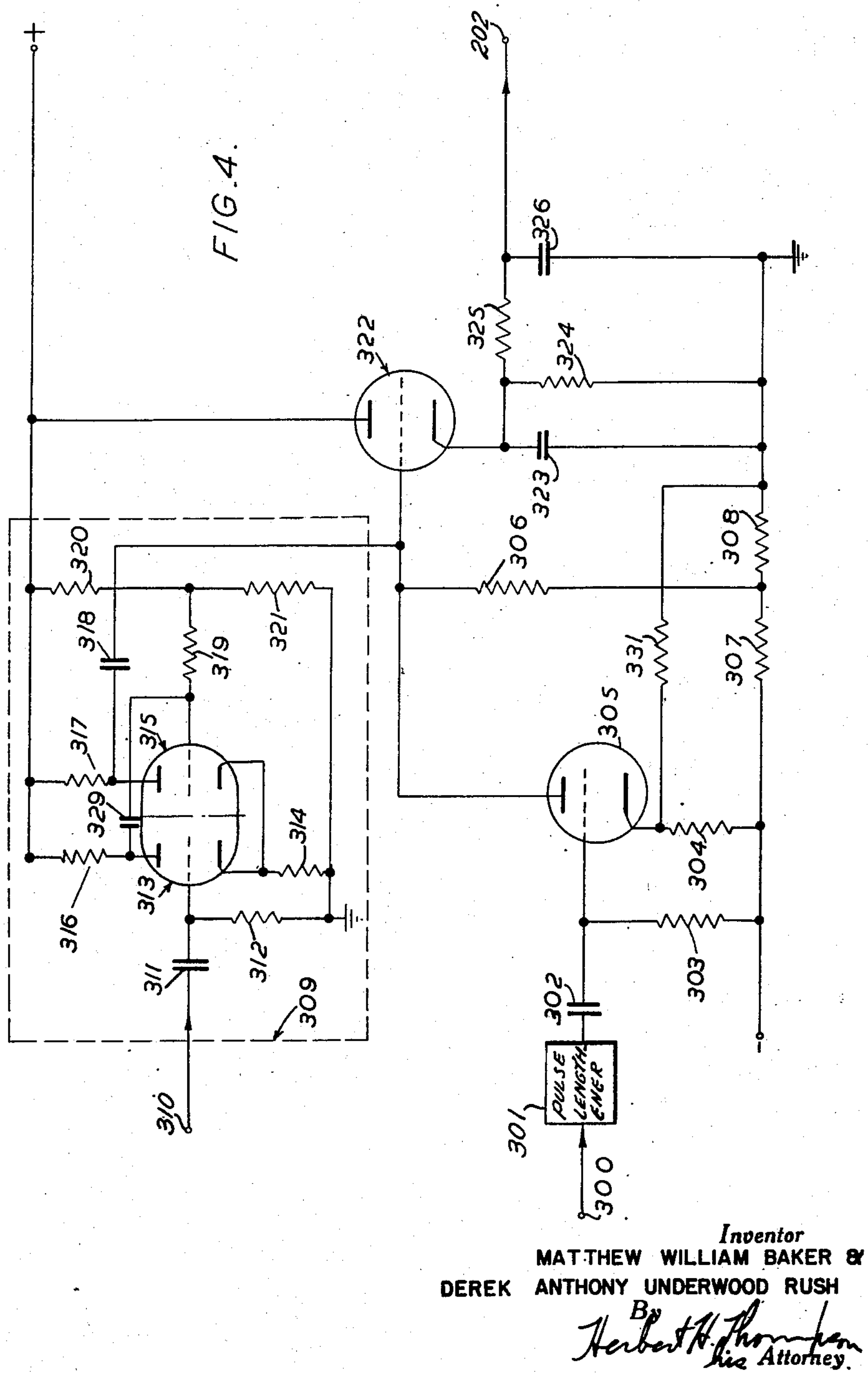

A simplified circuit of a preferred form of the timing comparator 3 is shown in Fig. 4. The reference signal B from the oscillator 1, which is in the form of a train of positive pulses, is passed through a pulse lengthener shown generally at 309 by means of which each of the pulses is lengthened to, say, 30 microseconds so that it is of the form shown at B'. The pulse-lengthening circuit 309 comprises two valves 313 and 315 (which may be the two portions of a double-triode valve) connected in a cathode coupled flip-flop circuit generally similar to the circuit of the two valves 205 and 209 shown in Fig. 3. This circuit has one stable and one unstable condition of operation. It is normally in the stable condition, but the arrival of the reference pulse B causes it to change to the unstable condition in which it remains for a period determined by the characteristics of the valves and the values of the associated components. The method of operation is as follows:

In the stable condition, valve 315 is conducting, since the grid is held at a positive potential with respect to ground by means of the potential divider 320, 321. As a result of the current through this valve, there is a voltage drop across the resistor 314 which makes the cathodes of both valves positive with respect to ground. Since the grid of valve 313 is held at earth potential by resistor 312, it is negative with respect to the cathode, and the valve therefore does not conduct. When the positive pulse B is applied to this grid over capacitor 311, valve 313 commences to conduct. The potential of the anode therefore drops and a negative pulse is fed to the grid of valve 315 over capacitor 329. This negative pulse causes the valve to cease to conduct and thus reduces the voltage drop across resistor 314. Valve 313 therefore continues to conduct, since its grid is only slightly negative with respect to its cathode. The potential of the grid of valve 315 commences to rise immediately after the termination of the negative pulse from the anode of valve 313, since the capacitor 329 charges through resistor 319. The component values are so chosen that at about the end of 30 micro-seconds the grid potential has risen to a value at which the valve 315 commences to conduct. The resulting current through resistor 314 causes the cathode potential of both valves to rise and cuts off valve 313. Thus the circuit is restored to its stable condition. When valve 315 is cut off, the anode potential rises, and when it recommences to conduct, its potential drops and thus a positive square wave of about 30 micro-seconds duration is effectively produced at the anode of valve 315. It is fed over capacitor 318 to the grid of valve 322.

The monitoring pulses D, which are derived from the thyratron output and which occur at the moment when the thyratron actually fires, are fed to terminal 300 and are lengthened into square waves D′ by the pulse-lengthening circuit 301 which is similar in action to the pulse-lengthening circuit 309 already described. The component values of this pulse-lengthening circuit are so chosen that a positive square wave D′ of approximately 100 micro-seconds duration is produced by each monitoring pulse D.

The lengthened monitoring pulses D′ are applied over capacitor 302 to the grid of amplifying valve 305. This valve has its anode connected through the anode load resistor 306 to a point which is maintained at a potential of about 20 volts negative with respect to ground by means of the potential divider comprising resistors 307 and 308 which are connected between the ground line and the 300-volt negative bias supply. The cathode of valve 305 is maintained by the potential divider 304, 331 (also connected between the ground line and the 300-volt negative bias supply) at a potential of approximately 290 volts negative with respect to ground, while the grid is held at 300 volts with respect to ground by resistor 303. Thus, the valve is normally non-conducting, but when the positive lengthened pulse D′ is applied to the grid, it conducts and an amplified and inverted version of this pulse D′′ is applied to the grid of valve 322.

Valve 322 is normally non-conducting, since the grid is at the same potential as the anode of valve 305, namely about 20 volts negative with respect to ground. Under these conditions the cathode of valve 322 is at ground potential, since no current flows through the cathode resistor 324. However, when the positive lengthened reference signal B′ is applied to the grid, the valve commences to conduct, and current through the valve produces a voltage drop across resistor 324, and thus charges capacitor 323. The valve continues to conduct and capacitor 323 continues to charge for the duration of pulse B′ or until the valve is cut off by the arrival of the negative lengthened monitoring pulse D′′. Thus, within certain limits, the charge of capacitor 323, and hence the voltage across it, is representative of the interval of time between the commencement of pulse B′ and the commencement of pulse D′′, which is in turn equivalent to the interval between the reference signal B and the monitoring pulse D.

The voltage across capacitor 323 is smoothed by the combination of resistor 325 and capacitor 326 and is applied to terminal 202 in the controllable delaying device (Fig. 3).

In operation, when the apparatus is first switched on, the voltage applied to terminal 202 (Fig. 3) is zero, and consequently the length of square wave F is determined solely by the characteristics of the valves 205, 209 and the associated component values. Thus, positive pulse H occurs at the maximum possible time after the negative pulse G. The thyratron therefore fires some considerable time after the occurrence of the reference pulse B, i. e. $T_1+T_2 \gg T_0$. As a result, monitoring pulse D will also occur some considerable time after the reference signal B and valve 322 (Fig. 4) will conduct for an appreciable portion of the lengthened pulse B′ before it is cut off by the arrival of the negative pulse D′′. Thus, capacitor 323 will be charged and a positive voltage applied to terminal 202. This positive voltage will decrease the length of square wave F and consequently cause pulses H and C to occur earlier. Thus, the thyratron also is caused to fire earlier. Eventually, a steady state is reached in which the thyratron fires practically at the instant at which the reference signal B occurs. In this state square wave D′′ and B′ commence practically simultaneously and valve 322 only conducts for a period long enough to compensate for the leakage of the charge on capacitor 323 through resistor 324.

What is claimed is:

1. Apparatus for producing a series of recurrent high-power electrical pulses in a predetermined time relationship with recurrent low-power primary signals, said apparatus comprising a source of recurrent low-power primary signals, a relay device for providing high-power pulses in response to triggering pulses, controllable delaying means for deriving said triggering pulses from said primary signals after a time delay that may be varied by means of a control quantity, means for producing reference signals delayed with respect to said primary signals by a fixed accurately determined interval, a timing comparator for comparing said reference signals and said high-power pulses, said comparator generating an error signal indicative of the time interval between said reference signals and said high-power pulses and means for controlling said controllable delaying means in accordance with said error signal to bring said high-power pulses substantially in synchronism with said reference signals thereby to compensate for variable systematic delays.

2. Apparatus as claimed in claim 1 in which the error signal is directly applied as a control quantity to said controllable delaying means to vary the delay introduced thereby.

3. Apparatus as claimed in claim 1 in which the primary signals and the reference signals are produced in the form of trains of electrical pulses.

4. Apparatus as claimed in claim 3 in which said trains of said electrical pulses are derived from the output of a crystal controlled oscillator.

5. Apparatus for producing a series of recurrent high-power electrical pulses in a predetermined time relationship with recurrent low-power primary signals, said apparatus comprising a source of recurrent low-power primary signals, a relay device for providing high-power pulses in response to triggering pulses, controllable delaying means for deriving said triggering pulses from said primary signals after a time delay that may be varied by means of a control quantity, said controllable delaying means comprising electronic apparatus having one stable and one unstable condition of operation and which is normally in the stable condition but is changed to the unstable condition by each of the pulses constituting the primary signal, said electronic apparatus remaining in the unstable condition for a period of time determined by said control quantity, after which period it reverts to the stable condition, means for producing reference signals delayed with respect to said primary signals by a fixed accurately determined interval, a timing comparator for comparing said reference signals and said high-power pulses, said comparator generating an error signal indicative of the time interval between said reference signals and said high-power pulses, and means for controlling said controllable delaying means in accordance with said error signal to bring said high-power pulses substantially in synchronism with said reference signals thereby to compensate for variable systematic delays.

6. Apparatus as claimed in claim 5 in which the triggering pulses are derived from electrical pulses produced by the change in said electronic apparatus from the unstable to the stable condition thereof.

7. Apparatus as claimed in claim 6 in which the electrical pulses are produced by a differentiating device.

8. Apparatus as claimed in claim 7 in which the triggering pulses are produced by a blocking oscillator device.

9. Apparatus for producing a series of recurrent high-power electrical pulses in a predetermined time relationship with recurrent low-power primary signals, said apparatus comprising a source of recurrent low-power primary signals, a relay device for providing high-power pulses in response to triggering pulses, controllable delaying means for deriving said triggering pulses from said primary signals after a time delay that may be varied by means of a control quantity, means for producing reference signals delayed with respect to said primary signals by a fixed accurately determined interval, a timing comparator for comparing said reference signals and said high-power pulses, said comparator comprising electronic gating valve means, said gating means being normally non-conducting, and means for causing said gating means to conduct under the control of said reference signal pulses and for causing said gating means to cease to conduct under the control of said high-power pulses whereby an error signal is developed in dependence on the length of time for which said gating means conducts, and means for controlling said controllable delaying means in accordance with said error signal to bring said high-power pulses substantially in synchronism with said reference signals thereby to compensate for variable systematic delays.

10. Apparatus as claimed in claim 9 wherein said gating valve means is provided with a cathode circuit including a resistor and a capacitor connected in parallel, said error signal being developed across said parallel connection.

11. Apparatus as claimed in claim 10 in which a smoothing circuit is provided for smoothing said error signal before said signal is applied to the controllable delaying means.

12. Apparatus for producing a series of recurrent high-power electrical pulses in a predetermined time relationship with recurrent low-power primary signals, said apparatus comprising a source of recurrent low-power primary signals, a relay device for providing high-power pulses in response to triggering pulses, controllable delaying means for deriving said triggering pulses from said primary signals after a time delay that may be varied by means of a control quantity, means for producing reference signals delayed with respect to said primary signals by a fixed accurately determined interval, a timing comparator for comparing said reference signals and said high-power pulses, said comparator comprising electronic gating valve means, said gating means being normally non-conducting, and means for causing said gating means to conduct under the control of said reference signal pulses and for causing said gating means to cease to conduct under the control of said high-power pulses whereby an error signal is developed in dependence on the length of time for which said gating means conducts, said means for actuating said gating means including a pulse lengthening circuit for lengthening each of the reference signal pulses before said pulses are applied to the gating valve, and means for controlling said controllable delaying means in accordance with said error signal to bring said high-power pulses substantially in synchronism with said reference signals thereby to compensate for variable systematic delays.

13. Apparatus as claimed in claim 12 wherein said gating means further includes a second pulse lengthening circuit for lengthening each of said high-power pulses before said pulses are applied to the gating valve.

14. Apparatus as claimed in claim 13 in which the respective pulse lengthening circuits comprise an electronic apparatus having one stable and one unstable condition of operation, said electronic apparatus being normally in the stable condition and being changed to the unstable condition by the respective pulses, remaining thereat for a predetermined period of time and thereafter reverting to the stable condition.

MATTHEW WILLIAM BAKER.
DEREK ANTHONY UNDERWOOD RUSH.

References Cited in the file of this patent

FOREIGN PATENTS

| Number | Country | Date |
|---|---|---|
| 957,197 | France | Feb. 14, 1950 |